Patented June 22, 1943

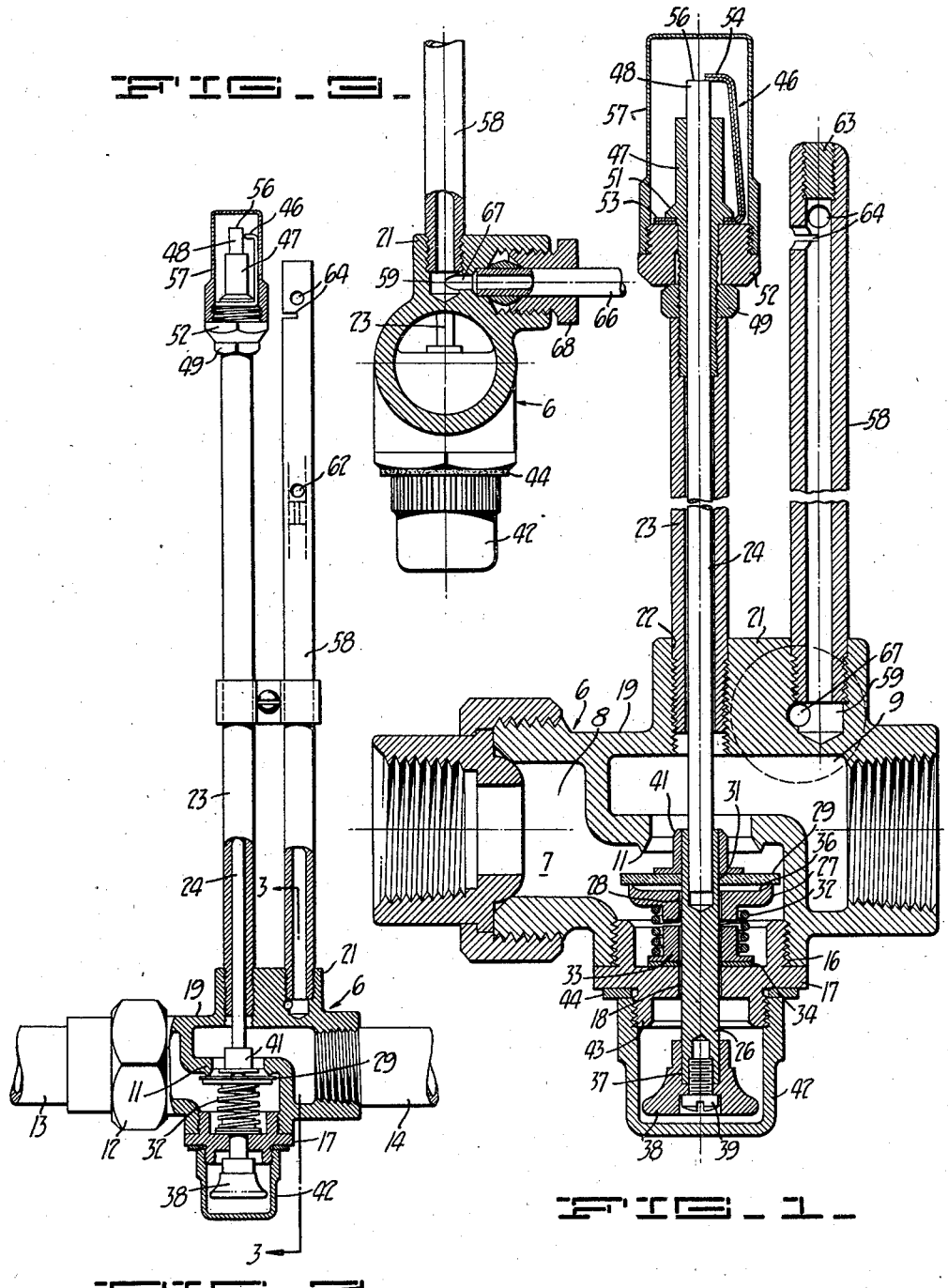

2,322,520

UNITED STATES PATENT OFFICE 2,322,520

THERMOSTATICALLY CONTROLLED SHUTOFF DEVICE

Wayne E. Jenkins, Los Angeles, Calif., assignor to Domestic Manufacturing Company, Inc., Los Angeles, Calif., a corporation of California Application August 9, 1940, Serial No. 351,976

5 Claims. (Cl. 137—161)

The invention relates to thermostatically controlled devices and more particularly to a pilot operated thermostatic shut-off device.

An object of the present invention is to provide a thermostatically controlled, pilot operated, shut-off device of the character described utilizing a thermal responsive expansible thermostatic element which is thermally associated with a pilot burner of a heating system and which in turn controls the operation of a shut-off device such as a valve or electric switch. One of the important features of the present invention is the provision of a structure wherein the length and speed and force of movement of the device adapted for thermostatic operation is wholly independent from the length and speed and strength of movement of the thermostatic element. In other words, the thermostatic element, though moving through a relatively small distance at a relatively slow speed and with a relatively small operating force, is nevertheless effective for controlling a relatively long, fast and powerful movement of the shut-off device.

Another object of the invention is to provide a shut-off valve of improved construction affording a positive and sure sealing of the passage with which it is used.

A further object of the invention is to provide an improved bimetal thermostatic element construction wherein the element may be of small size and required to move an exceedingly short distance and be subjected to a minimum operating force.

Still another object of the invention is to provide a thermostatically controlled pilot operated shut-off device of the character above which is unitarily and compactly constructed to support, house and properly locate all of the necessary elements of the control including a valve and thermostatic element construction and a gas pilot burner.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal sectional view of a thermostatically controlled shut-off device constructed in accordance with the present invention.

Figure 2 is a side elevation of the device illustrated in Figure 1 and shown with a portion of the device broken away and in section.

Figure 3 is a cross-sectional view of the device taken substantially on the plane of line 3—3 of Figure 2.

The thermostatically controlled shut off mechanism of the present invention may be adapted for use with either a gas or electric circuit and consists briefly of a flow-control device such as a valve or switch which is movable between flow permitting and flow stopping positions, in combination with means urging such device to one of said positions, and a thermostatic element which is designed and connected to operate as a catch to hold the device in the other of said positions when the element is heated and to release the device for movement by the aforementioned means when the element is cool. By reason of this construction the actual movement of the shut-off device may be controlled, as in the present construction, by means of a spring or other device and the thermostatic element operates as a catch in what may be termed a trigger mechanism for releasing the shut-off device for movement by the relatively powerful spring means. In this manner the length and speed and force of movement of the shut-off device may be multiplied many times over the length and speed and force of movement of the thermostatic element, thus insuring a thermostatically controlled shut-off device which is positive, sure and powerful in its operation.

With reference more specifically to the accompanying drawing, the device of the present invention is here embodied in the form of a pilot operated gas shut-off valve, although as will be hereinafter more clearly understood, the essential operating parts of the device may be readily adapted for use in opening or closing an electric switch or operating other mechanisms adapted for thermostatic operation. The several parts of the device are unitarily associated with and supported by a main body 6 here in the form of a casting and provided with an internal valve chamber 7 divided into inlet and discharge compartments 8 and 9 by an annular valve seat 11. The wall of the body defining the compartment 8 is open to the outside of the body and is preferably threaded exteriorly for the receipt of a coupling nut 12 of a fitting for an inlet conduit 13, and the wall of the body defining the outer portion of the compartment 9 is open and threaded interiorly so as to receive an end of a discharge conduit 14. As will be seen from Figures 1 and 2, the passages communicating the compartments 8 and 9 are substantially aligned so that the inlet and discharge conduits 13 and 14 connect to the opposite sides of the body.

The valve chamber itself is formed with an open portion 16 extending to the outside of the body and which is substantially aligned with the annular seat 11 along an axis at substantially right angles to the axis of the inlet and discharge passages. Threaded in the open portion 16 of the body is a closure plug 17 which is formed with a central aperture 18 aligned with the seat 11. The opposite side wall 19 of the body is here formed with a boss 21 within which is formed a threaded opening 22 which is also in alignment with the seat 11 and closure aperture 18. Threaded into the opening 22 is an end of a tube 23 which projects outwardly from the body wall 19 in substantial alignment with the parts aforementioned. A valve actuating rod 24 is slidably mounted within the tube 23 and extends into the valve chamber centrally through the seat 11 where the same is telescoped into an extension part 26, which continues through the closure aperture 18 to the exterior of the body. Preferably the rod sections 24 and 26 are held together by means of a pressed fit. Mounted on the rod section 26 below the valve seat 11, as viewed in Figures 1 and 2, is a valve backing plate 27 having a central aperture 28 which loosely encompasses the rod section 26 to enable the plate to have substantial freedom in movement along the rod. A valve disc 29, preferably of a soft compressible material such as "neoprene," is mounted between the backing plate 27 and the valve seat and in a closed position of the valve is held against the seat by means of the plate 27. The disc 29 is here formed with a central aperture 31 which snugly but slidably fits the rod section 26 for maintaining a seal about the rod in a closed position of the valve.

Means are used as above indicated for normally urging the valve to its seated position and as here shown this means is embodied in the form of a helical spring 32 which is compressed between the under-side of the backing plate 27 and a spring rest 33 slidably mounted on the rod section 26. Preferably a sealing gasket 34 having a center aperture snugly fitting the rod section 26 is mounted between the spring rest 33 and the inner side of the closure 17 for sealing off the closure aperture 18. As will be understood, the spring rest 33 is normally held in compressed position against the gasket 34 by reason of the constant compressive force in the spring 32. In a closed position of the valve, as illustrated in Figure 2, the valve disc 29 is firmly compressed against the seat 11 by reason of the spring force operating on the backing plate 27. I have found that the loose support of the backing plate 28 on the rod section 26, by reason of a small clearance provided at the aperture 28, is of considerable importance in providing sureness and positiveness of sealing of the valve. By reason of this construction the backing plate 27 is permitted sufficient universality in its movement to insure a positive and uniform seating of the valve disc 29, regardless of any minor misalignment or angularity of the several parts comprising the valve assembly. I have also found that uniformity of the seal obtained may be additionally insured by constructing the upper face 36 of the backing plate 27 with a small concavity, so that any irregularity in the thickness of the valve disc 29 may be compensated for by a seating or nesting of the disc within the hollow concavity. Preferably, the diameter of the disc 29 is somewhat greater than the diameter of the backing plate 27 so that the disc will overhang the periphery of the backing plate, and the diameter of the seat 11 is somewhat smaller than the diameter of the backing plate so as to obtain a contact of the disc 29 within the dimensions of the concavity provided in the plate face 36. The valve construction is more fully described and claimed in my copending divisional application Ser. No. 405,943, filed in the United States Patent Office on Aug. 8, 1941, for Thermostatically controlled gas valve.

The valve is arranged to be opened manually and for this purpose I provide on the outer end 37 of the rod section 26 a finger engaging handle or knob 38, here secured to the end of the rod section 26 by means of a screw 39. An actuating connection between the rod and the valve is here obtained by means of a collar 41 which may be pressed or otherwise secured to the rod above the valve disc 29, so that upon longitudinal displacement of the rod, that is downwardly with respect to Figures 1 and 2, by means of the knob 38, the collar 41 will be drawn against the face of the disc so as to withdraw the disc and backing plate away from the seat against the resilient action of spring 32. Preferably, inasmuch as the manual setting of the valve will ordinarily be effected only occasionally, I prefer to enclose the knob and outer rod portion within a casing 42 which in the present instance is threaded onto an outwardly extending flange portion 43 of the closure 17. If desired and as here shown, a sealing gasket 44 may be mounted between the inner end of the casing 42 and the outer side of the closure so that when the casing is threaded home against the gasket, an effective sealing off of the interior gas passage is accomplished.

In accordance with the present invention, the valve mechanism is held in an open position, as illustrated in Figure 1, by means of a thermal responsive element 46 which is designed and arranged to operate as a catch for the rod in a heated position of the element and to release the rod in a cool position of the element to permit closing of the valve by means of the spring 32. The element 46, as will be presently described, is thermally associated with a pilot burner and normally maintained in a heated condition by the pilot burner so as to hold the valve mechanism in open position but will automatically release the valve for closing upon extinction of the pilot burner. Threaded into the upper end of the tube 23 is a bearing sleeve 47 which serves as a bearing for the outer end portion 48 of the rod and is in the present instance locked in place by means of a nut 49 abutting the end of the tube. The bearing member 47 is formed in the present case with a shoulder 51 which is used to clamp a spacer member 52 between the shoulder and the upper end of the nut 49. The bearing member 47 cooperates with the aperture 18 in the closure 17 for supporting the rod adjacent its opposite ends and as here shown, the upper end 48 of the rod projects from the upper end of the bearing sleeve. The thermostatic element here used is of the bimetal type and is composed of a strip having one end portion 53 anchored in place between the shoulder 51 and the upper face of the spacer member 52, the strip end 53 being apertured to receive the bearing sleeve below the shoulder. The strip extends outwardly from the end portion 47 approximately longitudinally, substantially parallel to the rod 48 and is formed with a hooked or offset outer end 54 which in a heated position of the strip overhangs and engages the end face 56 of the outer rod end 48 when the valve assembly is moved longitudinally to open position. The construction of the bimetal strip is such that the same will flex the outer end 54 thereof towards the rod when the strip is heated and will flex the end 54 away from the rod when the strip is cool. The total movement required of the strip end is only relatively slight and only need be sufficient to hook over the edge of the rod end and to retract therefrom By reason of this small required movement, the strip may be of a relatively very small length and constructed of relatively heavy material. It will also be noted that the force exerted on the bimetal strip to hold the valve in open position is essentially longitudinally of the strip, subjecting the latter to tensional stress which does not interfere with or oppose the expansive force couple set up by the different metals comprising the strip to produce flexing of the strip. Thus the force or energy necessary for operating the valve is not dependent upon the force or energy developed by the bimetal strip in flexing under the influence of temperature variations. Also as will be clear, the speed of movement of the valve is not dependent upon the speed of movement of the bimetal strip, for the latter has only to move away from the end of the rod to permit a rapid and powerful closing of the valve by the compression spring 32.

As an important feature of the present construction, the bimetal strip and rod end are protected from the direct impingement of the pilot flame by the housing of these members in a chamber at the end of the tube. While such a chamber may be fashioned in various ways, I prefer to use a casing 57, preferably of relatively thin metal which may conveniently be threaded directly onto the spacer member 52. Besides protecting the operating element against flame impingement, this casing also insures a sealing of any gas leakage at the outer end of the tube and bearing sleeve.

As above indicated, the pilot burner is unitarily associated with the other parts of the apparatus so as to properly position the parts in operable arrangement. As here shown, a conduit or tube 58 is threaded into a gas passage 59 provided in the boss 21 and extends outwardly from the boss in substantially parallel relation to the tube 23. A gas Venturi constriction is preferably provided in the tube intermediate its ends and above which is provided primary air openings 62. The outer end of the tube is here closed by a plug 63 and a series of burner ports 64 are provided adjacent the outer end of the tube and which are spaced and constructed so as to direct flame against the base of casing 57 and also laterally of the casing for ignition of a main gas burner, not shown. A gas conduit 66 for conveying gas to the pilot burner is preferably provided independent of the gas passages 8 and 9 and as will be best seen from Figure 3, this conduit may be connected to a gas inlet passage 67 communicating with the passage 59 by means of a fitting 68.

In a typical installation of the present device, the gas conduits 13 and 14 are part of the gas main leading to a main gas burner such as may be used in a hot water heater, stove, heater, furnace, etc., below the main gas cock control or thermostat or the like. In such installations it is desirable to maintain a steady pilot flame and to frequently interrupt the main burner operation. For this reason the pilot burner is connected by a separate conduit 66 to the gas line ahead of the main burner cock or thermostat or the like. Initially the pilot burner is ignited so as to heat the bimetal strip and thereafter the casing 42 is removed and the valve manually opened by retraction of the knob 38 so as to cause a hooking of the thermostat element over the outer end of the rod. Gas flowing through the open valve to the main burner will then be ignited by the pilot burner. The casing 42 is then preferably replaced so as to protect the exposed parts against accidental or wrongful manipulation. Thereafter at any subsequent time that the pilot flame should be extinguished, as for example by reason of a temporary interruption of gas supply service or by a blowing out of the pilot flame or the like, the thermostatic strip will be quickly cooled and the main burner valve sprung to closed position to thereafter shut off the escape of gas and prevent a re-lighting of the main burner until after the pilot flame has been re-established. To reset the apparatus it is only necessary to re-ignite the pilot flame and pull out on the knob 38 so as to reengage the thermostatic strip with the rod end.

While I have herein illustrated a gas valve assembly, it will be understood that the various operating parts may be readily applied to the actuation of an electric switch or other device. For example, the valve and seat parts may be replaced by electric switch contacts so as to obtain an opening and closing of an electric switch in the same manner as the valve is herein moved and operated. Similarly, the opening and closing action of either the valve or an electric switch may be readily reversed by rearranging the positions of the valve and switch parts to obtain a reverse opening and closing action upon longitudinal reciprocation of the rod.

I claim:

1. A thermostatically controlled gas shut-off valve comprising, a body formed with a valve chamber, a valve mounted in said chamber for movement to and from a passage closing position, spring means urging said valve to passage closing position, a valve stem connected to said valve for movement of the latter to open position upon longitudinal displacement of said stem and a thermostatic strip having an end portion mounted transversely across the longitudinal axis of said stem and a center portion bent at substantially right angles to said end portion and extending alongside of said stem to adjacent the outer end thereof, the opposite free end of said strip being bent at substantially right angles to said center portion and in the direction of said first strip end and being positioned and adapted to hook over said stem end to hold said stem in an axially displaced valve open position, said strip being mounted so as to flex said strip end to and from said stem as the strip is heated and cooled respectively whereby when cool said strip end will disengage and release said stem end for movement of said valve to closed position under the operation of said spring means.

2. A thermostatically controlled gas shut-off valve comprising, a body formed with a valve chamber having a valve seat therein, a valve mounted in said chamber for movement to and from said seat, spring means urging said valve to seated position, a tube carried by said body in alignment with said valve movement, a valve stem extending longitudinally through and slidably carried by said tube and projecting from the outer end thereof, and a bimetal strip having an end portion carried by said tube across the longitudinal axis of said stem and a center portion bent at substantially right angles to said end portion and extending outwardly from said tube in side by side relation to said stem to adjacent the outer end thereof, said strip having its outer free end offset in the direction of said stem and movable when heated into a position hooking over the end of said stem when the latter is displaced longitudinally to open said valve against the resilience of said spring, said strip being operable when cooled to retract its said end from said stem to permit closing of said valve under the action of said spring.

3. A thermostatically controlled gas shut-off valve comprising, a body formed with a valve chamber having a valve seat therein, a valve mounted in said chamber for movement to and from said seat, spring means urging said valve to seated position, a tube carried by said body in alignment with said valve movement, a valve stem slidably mounted for longitudinal reciprocation in said tube and projecting from the outer end thereof, a bimetal strip carried by said tube adjacent said tube end and extending longitudinally therefrom alongside of said stem, said strip having its outer end offset in the direction of said stem and movable when heated into a position hooking over the end of said stem when the latter is displaced longitudinally to open said valve against the resilience of said spring, said strip being operable when cooled to retract its said end from said stem to permit closing of said valve under the action of said spring, and a casing secured to said tube and enclosing the outer end of said stem and said bimetal strip in a gas tight chamber.

4. A thermostatically controlled gas shut-off valve comprising, a body formed with a valve chamber having a valve seat therein, a valve mounted for movement to and from said seat, spring means urging said valve to seated position, a valve stem extending from said body, a tube having one end thereof secured to said body concentric with said stem and extending from said body in surrounding relation to said stem, a bearing sleeve member connected to the outer end of said tube and forming a longitudinal extension thereof and providing a sliding support for the outer end of said stem, said member having a shoulder thereon, a spacer member clamped between said shoulder and the end of said tube, and a thermostatic strip having a substantially straight central portion and an offset end, said strip end being perforated to surround said sleeve member and clamped in place by said shoulder to position said strip central portion substantially parallel to said stem, the outer end of said stem extending from said sleeve member, the opposite outer end of said strip being offset in the direction of said first strip end to engage the outer end of said stem in a heated position of said strip when said stem is longitudinally displaced to open said valve, said outer strip end being retracted from said stem in the cool position of said strip to release said stem for movement of said valve to closed position.

5. A thermostatically controlled gas shut-off valve comprising, a body formed with a valve chamber having a valve seat therein, a valve mounted for movement to and from said seat, spring means urging said valve to seated position, a valve stem extending from said body, a tube having one end thereof secured to said body concentric with said stem and extending from said body in surrounding relation to said stem, a bearing sleeve member connected to the outer end of said tube and forming a longitudinal extension thereof and providing a sliding support for the outer end of said stem, said member having a shoulder thereon, a spacer member clamped between said shoulder and the end of said tube, a thermostatic strip having a substantially straight central portion and an offset end, said strip end being perforated to surround said sleeve member and clamped in place by said shoulder to position said strip central portion substantially parallel to said stem, the outer end of said stem extending from said sleeve member, the opposite outer end of said strip being offset in the direction of said first strip end to engage the outer end of said stem in a heated position of said strip when said stem is longitudinally displaced to open said valve, said outer strip end being retracted from said stem in the cool position of said strip to release said stem for movement of said valve to closed position, and a thin wall metal casing mounted on said spacer member and completely encasing said thermostatic strip and serving to shield said strip from flame impingement and to seal the outer end of said tube and bearing sleeve member.

WAYNE E. JENKINS.